(12) United States Patent
Leinemann

(10) Patent No.: US 7,959,434 B2
(45) Date of Patent: Jun. 14, 2011

(54) FLAME ARRESTER ARRANGEMENT AND METHOD OF INCORPORATING BORE IN A FLAME ARRESTER ARRANGEMENT

(75) Inventor: Christoph Leinemann, Braunschweig (DE)

(73) Assignee: Leinemann GmbH & Co. KG, Braunschweig (DE)

( * ) Notice: Subject to any disclaimer, the term of this patent is extended or adjusted under 35 U.S.C. 154(b) by 0 days.

(21) Appl. No.: 12/635,047

(22) Filed: Dec. 10, 2009

(65) Prior Publication Data

US 2010/0083479 A1    Apr. 8, 2010

(51) Int. Cl.
*B23P 1/12*    (2006.01)
*B23H 7/02*    (2006.01)
(52) U.S. Cl. ............................ 431/346; 431/187; 29/428
(58) Field of Classification Search .................. 431/346; 29/428
See application file for complete search history.

(56) References Cited

U.S. PATENT DOCUMENTS

| | | | |
|---|---|---|---|
| 1,896,286 A | 2/1933 | Burns et al. | |
| 2,420,599 A | 5/1947 | Jurs ................. | 48/192 |
| 2,613,144 A * | 10/1952 | Carnahan ................. | 48/192 |
| 4,638,139 A * | 1/1987 | Pirone ................. | 219/69.12 |
| 6,403,910 B1 * | 6/2002 | Stang et al. ................. | 219/69.11 |
| 7,241,137 B2 | 7/2007 | Leinemann et al. | |

FOREIGN PATENT DOCUMENTS

| | | |
|---|---|---|
| DE | EP 0175054 | 4/1982 |
| EP | 1437191 A1 | 7/2004 |
| GB | 2 190 992 A | 12/1987 |
| JP | 57121424 A * | 7/1982 |
| WO | WO 2005014112 A1 | 2/2005 |

OTHER PUBLICATIONS

STIC 3700 search.*

* cited by examiner

*Primary Examiner* — Steven B McAllister
*Assistant Examiner* — Nikhil Mashruwala
(74) *Attorney, Agent, or Firm* — Whitham Curtis Christofferson & Cook, PC

(57) ABSTRACT

In a flame arrester arrangement which is formed from two metal strips (8, 9) which are wound together to form a disk having an approximately circular outer circumference and of which a first metal strip (8) is a smooth strip and the second metal strip (9) is a corrugated strip having defined corrugation, the two strips (8, 9), by bearing against one another, forming defined gaps (11) for passage of a fluid and being held in position, relative to one another by fixing pins inserted into radial bores (6), the radial bores (6) can be incorporated without deforming the gaps (11) even in the region of the bores (6) by virtue of the fact that the bores (6) are incorporated by spark erosion without deforming the corrugation formed in the second metal strip, such that the gaps (11) are also present in the region of the bores (6) in the manner defined by the corrugation.

1 Claim, 2 Drawing Sheets

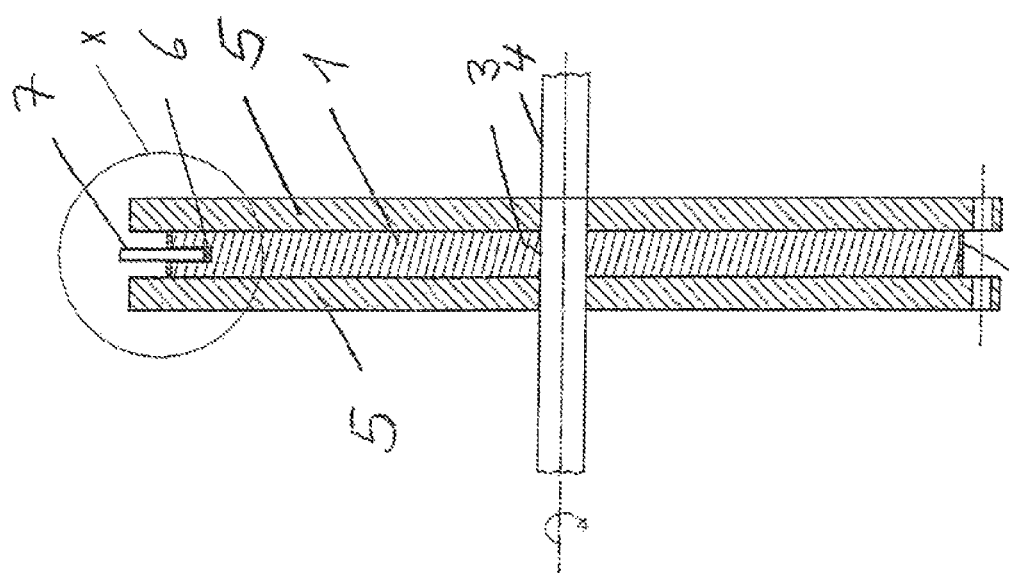
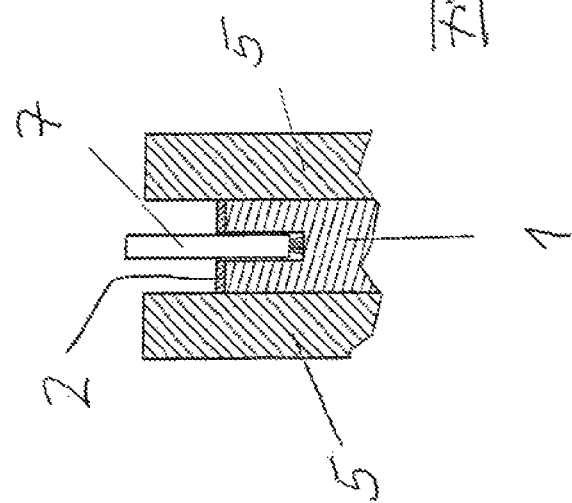

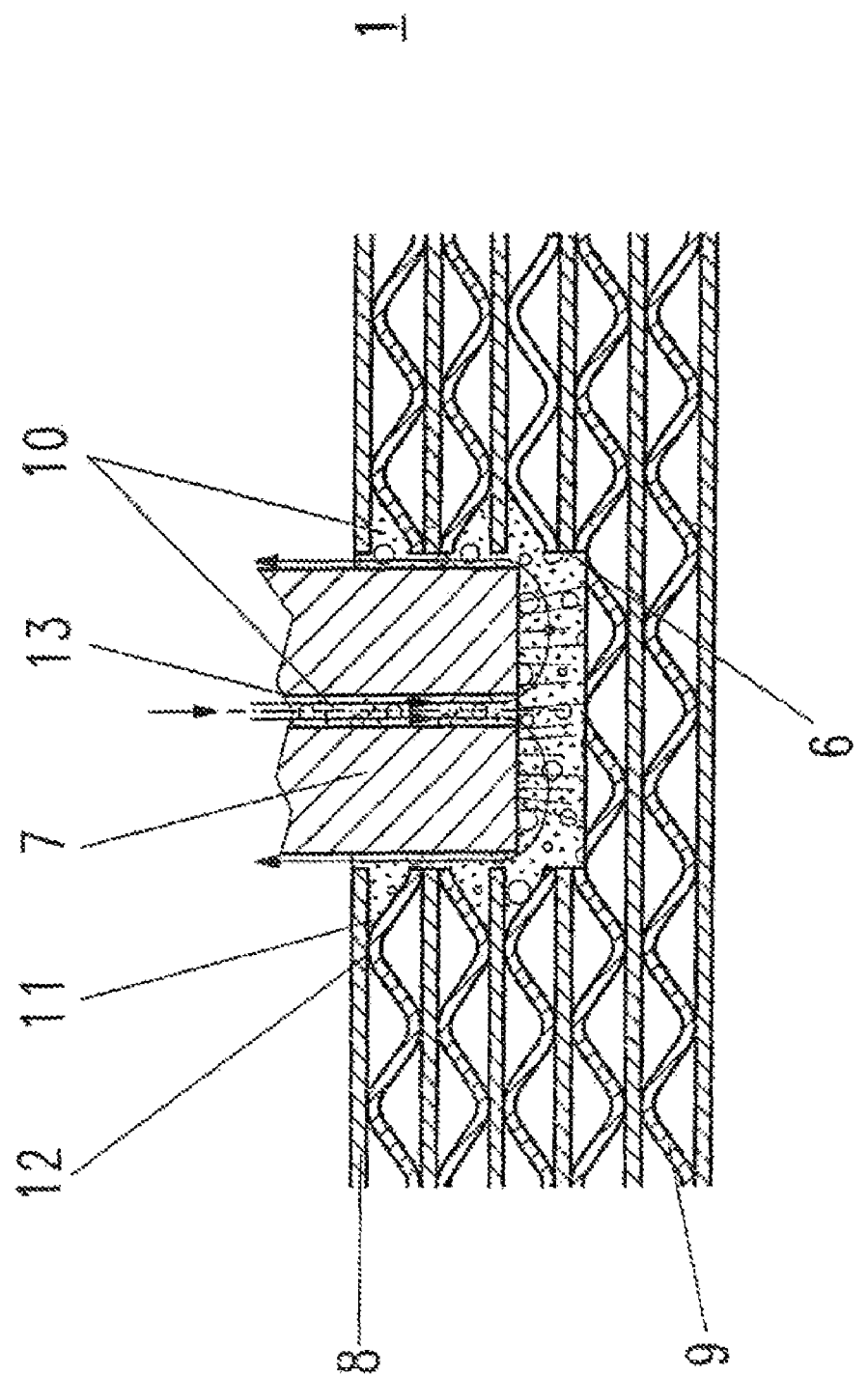

FLAME ARRESTER ARRANGEMENT AND METHOD OF INCORPORATING BORE IN A FLAME ARRESTER ARRANGEMENT

The invention relates to a method of incorporating radially oriented bores for fixing pins in a flame arrester arrangement which is formed from two metal strips which are wound together to form a disk having an approximately circular outer circumference and of which a first metal strip is a smooth strip and the second metal strip is a corrugated strip having defined corrugation, the two strips, by bearing against one another, forming defined gaps for passage of a fluid.

The invention also relates to a flame arrester arrangement which is formed from two metal strips which are wound together to form a disk having an approximately circular outer circumference and of which a first metal strip is a smooth strip and the second metal strip is a corrugated strip having defined corrugation, the two strips, by bearing against one another, forming defined gaps for passage of a fluid and being held in position relative to one another by fixing pins inserted into radial bores.

Flame arrester arrangements whose fluid passage gaps are formed by a corrugated strip, having defined corrugation, in combination with a smooth strip defining the corrugated strip on both sides have been known for a long time. Such flame arrester arrangements are produced by the smooth strip being jointly wound spirally together with the corrugated strip.

The metal strips used for producing the flame arrester insert must be made of high-temperature high-grade steel, not only in order to have the requisite thermal stability, but also in order to be resistant to aggressive media, i.e. in order not to corrode. Corrosion phenomena would alter the defined fluid passage gaps and would thus possibly constitute a safety risk.

The mechanical strength of flame arresters depends in particular on the coefficient of friction of the metal strips at the contact points.

The corrosion-resistant materials used are regularly distinguished by a very smooth, i.e. polished, surface, and therefore the stability of a flame arrester of the type in question here may constitute a problem, in particular at larger diameters, on account of the relatively low coefficient of friction. Special devices must possibly be provided in order to be able to fit the wound flame arrester inserts into a housing in which the inserts are held in a stable manner. It has already been attempted to increase the stability of the flame arrester inserts by reinforcements brazed on axially. As a result, however, not only does the cost become higher, but handling during both production and maintenance of the flame arresters becomes more awkward.

It is known to incorporate radial bores in such flame arrester arrangements from the outside, which bores can extend as far as a winding core of the flame arrester arrangement. A radial positive-locking connection between the links of the wound flame arrester arrangement is produced by inserting fixing pins into these bores. Depending on the size of the wound disk, normally between four and eight bores with fixing pins are provided. Of course, it is also possible to drive the bores through the entire diameter of the flame arrester arrangement.

Even when the radial bores are driven carefully into the flame arrester arrangement by means of a drill, the metal strips in the region of the bores are deformed, such that passage gaps of the flame arrester arrangement in the region of the radially incorporated bores or of the fixing pins are deformed. As a result, the specified maximum nominal diameters of the bores are no longer reliably adhered to, since the deformations are uncontrolled and may therefore lead to increases in size of the gap cross sections. Due to an increased gap cross section, however, a flashback through the flame arrester may occur, because a penetrating ignited gas is no longer sufficiently cooled in the enlarged gap cross section, such that the flame is not reliably extinguished.

The use of the known flame arrester arrangement which is held together by fixing pins inserted into bores is therefore not possible with the requisite product safety at least for critical applications, for example in the case of highly explosive gases.

Other methods are therefore pursued in order to stabilize flame arrester arrangements, for example by applying brazed-on reinforcement elements, or the like. As a result, however, the outlay—and thus the price—for the flame arrester arrangement is considerably increased.

The object of the invention is therefore to permit positive-locking fixing of the windings of a wound flame arrester arrangement without having to entail risks for the design of the defined passage gaps.

This object is achieved according to the invention by a method of the type mentioned at the beginning in that the wound flame arrester arrangement is completely closed off axially on both sides by retaining plates, and in that the bore is incorporated radially inward from the outer circumference by a spark erosion electrode while injecting a cooling liquid.

Accordingly, said object is achieved by a flame arrester arrangement of the type mentioned at the beginning in that the bores are incorporated by spark erosion without deforming the corrugations formed in the second metal strip, such that the gaps are also present in the region of the bores in the manner defined by the formed corrugation.

The present invention is based on the knowledge that the holes complementing one another to form a bore can also be incorporated in thin metal strips by spark erosion without deforming the metal strips in the region of the holes produced. According to the invention, provision is therefore made for it to be possible for the liquid which is required for the spark erosion and which serves to cool the metal strips and to remove the material eroded for the bore to be introduced into the axially open flame arrester arrangement if the wound flame arrester arrangement is completely closed off axially on both sides by retaining plates. This means that a closed liquid circuit is formed in the region of the produced bore and the liquid does not escape in an undefined manner through the axially open gaps.

This is the essential precondition in terms of the method for enabling the spark erosion drilling, which is actually only intended for solid materials, to now also be used according to the invention in a flame arrester arrangement wound with defined spaces.

In this case, according to the invention, a flame arrester arrangement is realized whose bores do not alter the gaps defined by the corrugation, such that the fixing pins can be inserted for the positive-locking connection of the links of the wound flame arrester arrangement without there being the risk of the critical flame gap dimensions being altered.

The flame arrester arrangement according to the invention is preferably spirally wound. In principle, however, it is also possible to also provide the pinning according to the invention for the winding of a multiplicity of metal strips wound in parallel.

The invention is to be explained below with reference to the attached drawing in which:

FIG. 1 shows a schematic illustration of a wound flame arrester arrangement between two retaining plates for incorporating a bore by means of a spark erosion electrode;

FIG. 2 shows an enlarged detail X from FIG. 1;

FIG. 3 shows a cross section through windings of the wound flame arrester arrangement in the region of the outer circumference, with a spark erosion electrode inserted for producing a bore.

FIG. 1 shows a wound flame arrester arrangement 1 which forms a flat disk having an approximately circular outer circumference and can be closed off radially on the outside by a closing circumferential layer 2. The flame arrester arrangement 1 has a central axial through-hole 3, through which a retaining shaft 4 is inserted, such that the flame arrester arrangement 1 is rotatably mounted on the retaining shaft 4.

For carrying out the method according to the invention, the flame arrester arrangement 1 is closed off axially on both sides in a sealed-off manner by a respective retaining plate 5.

FIG. 1 shows that, to incorporate a radial bore 6 in the flame arrester arrangement 1, a spark erosion electrode 7 is inserted into the flame arrester arrangement from the outer circumference. The spark erosion electrode 7 drives holes into the wound layers of the flame arrester arrangement by spark erosion and thus in effect advances the bore 6 radially toward the center of the disk-shaped flame arrester arrangement 1.

FIG. 2 illustrates this in an enlarged illustration.

FIG. 3 shows a vertical section through an axial center plane of the flame arrester arrangement 1, thereby illustrating the construction of the flame arrester arrangement 1 of alternately arranged windings of a smooth first metal strip 8 and of a corrugated strip provided with defined corrugation and forming a second metal strip 9. Furthermore, it becomes clear from the illustration of FIG. 3 that cooling liquid 10 is directed into the bore via a central bore 13 of the spark erosion electrode 7. The liquid is prevented from flowing off in the axial direction by means of the retaining plates 5 arranged in a sealed-off manner, while the gaps 11 affected by the bore between the first metal strip 8 and the second metal strip 9 are filled with liquid 10 in the circumferential direction. In the process, however, the liquid can only advance as far as contact points 12 between the first metal strip 8 and the second metal strip 9 and is therefore held in an enclosed space in the region of the bore 6. This ensures that the liquid is introduced into the bore 6 in a defined manner and escapes again from the bore 6 at the outer circumference of the spark erosion electrode 7 and can thus fulfill the function of cooling and removing the eroded material, said function being required for the spark erosion drilling.

By the measures according to the invention, the bore 6 can therefore be incorporated in a manner similar to that in solid material, although the flame arrester arrangement has the axially open spaces forming the gaps 11.

It has been found that the bore 6 incorporated by spark erosion leads to no changes at all in the shape of the corrugation of the second metal strip 9 or in the shape of the smooth first metal strip 8, such that the defined cross sections of the gaps 11 of the flame arrester arrangement 1 are retained unchanged even in the region of the bore 6.

Suitable fixing pins are then inserted into the finished bores 6, such that the windings of the wound metal strips 8, 9 are now connected to one another in a positive-locking manner, and therefore axial displacement of the windings of the metal strips 8, 9 is no longer possible. Further stabilization of the flame arrester arrangement 1 is then no longer necessary.

The invention claimed is:

1. A method of manufacturing a flame arrester arrangement, comprising:
    winding together two metal strips to form a disk having an approximately circular outer circumference wherein a first metal strip of said two metal strips is a smooth strip and a second metal strip of said two metal strips is a corrugated strip having defined corrugation, the two strips, by bearing against one another, form defined gaps for passage of a fluid;
    closing off axially the defined gaps on both sides of said disk using retaining plates;
    forming one or more bores radially inward from an outer circumference of said disk by a spark erosion electrode while injecting a cooling liquid; and
    securing one or more fixing pins in said one or more bores.

* * * * *